US010029854B2

(12) United States Patent
Felton

(10) Patent No.: US 10,029,854 B2
(45) Date of Patent: *Jul. 24, 2018

(54) BELT CONVEYOR LOAD ZONE SUPPORT ASSEMBLY

(71) Applicant: Superior Industries, Inc., Morris, MN (US)

(72) Inventor: Jarrod J. Felton, Cyrus, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,643

(22) Filed: Jul. 13, 2017

(65) Prior Publication Data

US 2017/0305673 A1    Oct. 26, 2017

Related U.S. Application Data

(63) Continuation of application No. 15/383,183, filed on Dec. 19, 2016, now Pat. No. 9,714,141, which is a continuation of application No. 12/381,744, filed on Mar. 16, 2009, now abandoned.

(51) Int. Cl.
    *B65G 15/62*    (2006.01)
    *B65G 15/08*    (2006.01)

(52) U.S. Cl.
    CPC ............ *B65G 15/62* (2013.01); *B65G 15/08* (2013.01); *B65G 2201/045* (2013.01); *B65G 2207/48* (2013.01)

(58) Field of Classification Search
    CPC ........ B65G 15/60; B65G 15/62; B65G 21/06; B65G 15/08; B65G 2201/045; B65G 2207/48
    See application file for complete search history.

(56) References Cited

U.S. PATENT DOCUMENTS

| | | | | |
|---|---|---|---|---|
| 2,731,138 A * | 1/1956 | Parisi | ..................... | B65G 21/02 198/823 |
| 4,898,272 A * | 2/1990 | Swinderman | .......... | B65G 15/62 198/823 |
| 5,350,053 A * | 9/1994 | Archer | ................... | B65G 15/62 198/525 |
| 5,590,757 A * | 1/1997 | Walter | ................... | B65G 15/62 198/812 |
| 5,799,780 A * | 9/1998 | Steeb, Jr. | ............... | B65G 15/62 198/823 |
| 5,927,478 A * | 7/1999 | Archer | ................... | B65G 15/62 198/823 |
| 5,988,360 A * | 11/1999 | Mott | ...................... | B65G 15/62 198/823 |
| 6,237,753 B1 * | 5/2001 | Walter | ................... | B65G 15/62 198/824 |
| 6,269,943 B1 * | 8/2001 | Mott | ...................... | B65G 15/08 198/823 |
| 6,913,138 B2 * | 7/2005 | Wiggins | ................ | B65G 15/62 198/823 |

(Continued)

*Primary Examiner* — Mark A Deuble
(74) *Attorney, Agent, or Firm* — Dicke, Billig & Czaja, PLLC

(57) ABSTRACT

A cartridge assembly for use in a load zone support includes a shaft that is able to be connected to an idler frame of a belt conveyor system. The cartridge assembly further includes a support plate coupled to the shaft and a wear pad coupled to the support plate.

40 Claims, 6 Drawing Sheets

(56) References Cited

U.S. PATENT DOCUMENTS

| | | | | |
|---|---|---|---|---|
| 7,527,144 | B2* | 5/2009 | Ostman | B65G 15/62 |
| | | | | 198/823 |
| 8,210,344 | B2* | 7/2012 | Croftcheck | B23P 6/00 |
| | | | | 198/828 |
| 9,714,141 | B2* | 7/2017 | Felton | B65G 15/62 |
| 2004/0094392 | A1* | 5/2004 | Boudreau | B65G 15/60 |
| | | | | 198/823 |

* cited by examiner

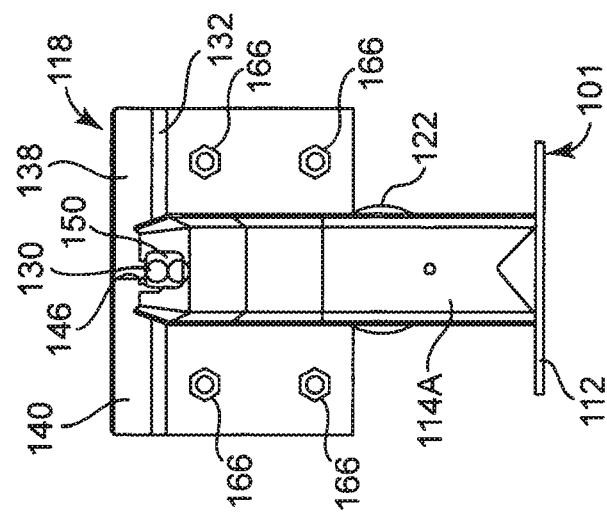
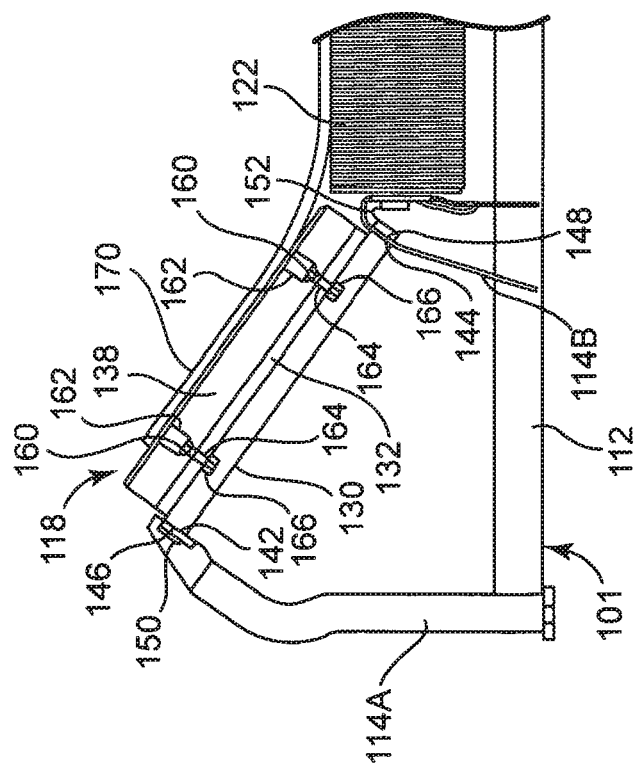

BELT CONVEYOR LOAD ZONE SUPPORT ASSEMBLY

CROSS REFERENCE TO RELATED APPLICATION

This a continuation of U.S. patent application Ser. No. 15/383,183, filed Dec. 19, 2016, now pending, which is a continuation of U.S. patent application Ser. No. 12/381,744, filed Mar. 16, 2009, now abandoned.

BACKGROUND

This disclosure generally relates to belt conveyor equipment for bulk material transportation. More specifically, the present disclosure relates to a conveyor belt support assembly for a load zone of bulk material transportation equipment.

Belt conveyors are employed to transport bulk material, such as sand, gravel and the like, from a feed end of a conveyor system, where the material is deposited on the belt, to the opposite end of the conveyor system, where the material is discharged from the belt. Most belt conveyors employ a form of endless belt that is wrapped over a motor-driven head pulley mounted on a frame of the conveyor system at the discharge end and a return idler pulley mounted on the conveyor system frame at the feed end. Between the feed end and the discharge end, the belt is supported on a plurality of troughing idler assemblies that are mounted periodically along the frame of the conveyor.

A series of troughing idler frames or supports 10 are shown in FIG. 1, each idler frame 10 including a base 12 that mounts to the frame of the conveyor. Connected to each base 12 is a plurality of outer perch supports 14A and inner perch supports 14B for supporting three idler rollers 16A-C in a generally U-shaped configuration. As such, outer supports 14A located at each end of base 12 support one end of a shaft carrying outermost rollers 16A and 16C at a specified height above base 12, while inner supports 14B are positioned on base 12 to support the ends of a shaft carrying a central roller 16B as well as an opposite end of the shaft carrying rollers 16A and 16C at a height below the height of outer supports 14A relative to base 12.

At the feed end of the conveyor, material is deposited on the belt in a load zone that typically comprises a walled hopper that directs the material onto the belt. As the material strikes the belt, the belt is prone to sagging between adjacent idler assemblies, which can result in material falling off the belt in the load zone area. One known method for addressing this problem involves substituting the two outermost rollers of several idler supports in the load zone with one or more long support rails supported across the several idler supports, such as is disclosed in U.S. Pat. No. 5,350,053. While support rails extend along and support the belt edges in the load zone and prevent belt sagging, they have their drawbacks. For example, wear inevitably occurs on the material of the support rail in contact with the underside of the belt. This wear may be localized in only one portion of the support rail. As a result, replacement of the entire support rail is required. This replacement is difficult, time consuming and costly. Thus, there is a need to improve the support assembly for the load zone of a belt conveyor to overcome these drawbacks.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 is schematic front view of an idler frame supporting a cartridge assembly and an impact roller.

FIG. 4 is a side view of the idler frame of FIG. 3.

DETAILED DESCRIPTION

In the following Detailed Description, reference is made to the accompanying drawings, which form a part hereof, and in which is shown by way of illustration specific embodiments in which the belt conveyor load zone assembly may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the detailed description. The following detailed description, therefore, is not to be taken in a limiting sense, and the scope of rights sought is defined only by the appended claims.

It is to be understood that the features of the various exemplary embodiments described herein may be combined with each other, unless specifically noted otherwise.

Figure 1:
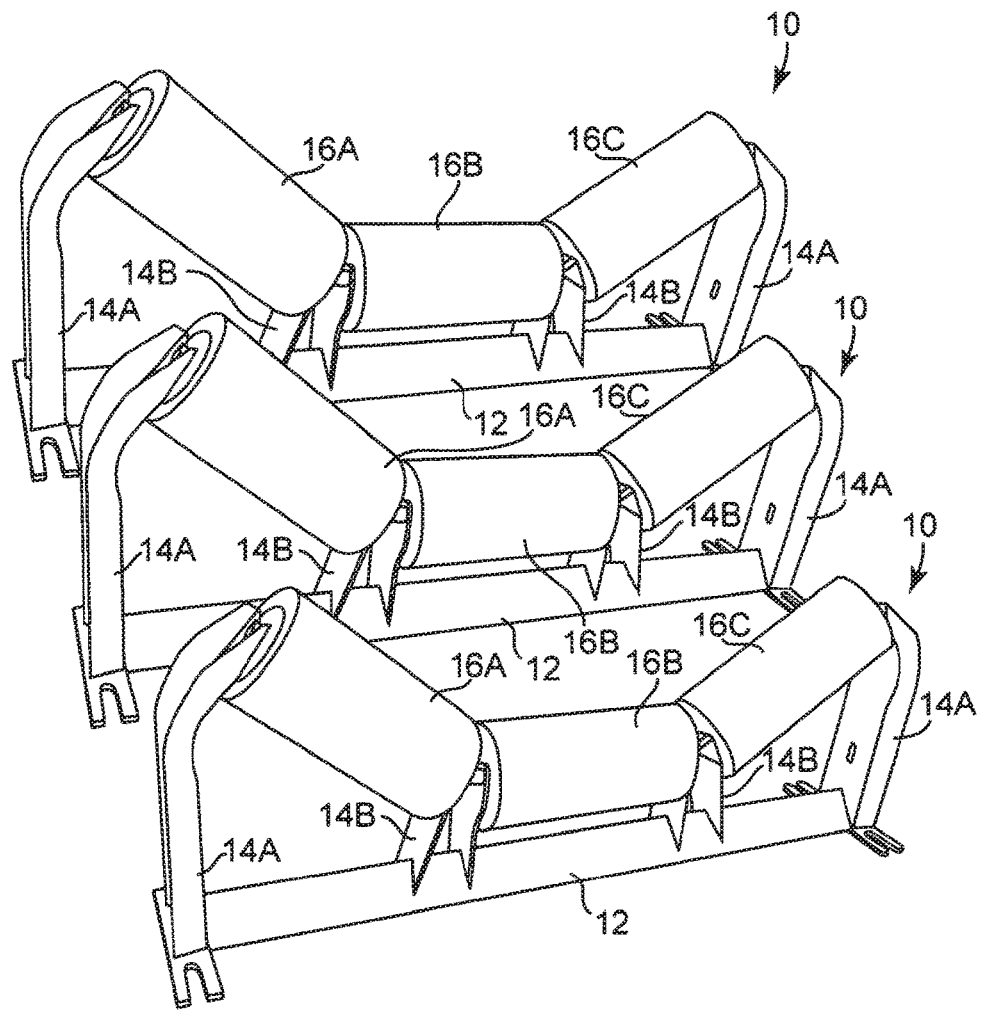
FIG. 1 is a perspective view of a series of troughing idlers.
Figure 2:
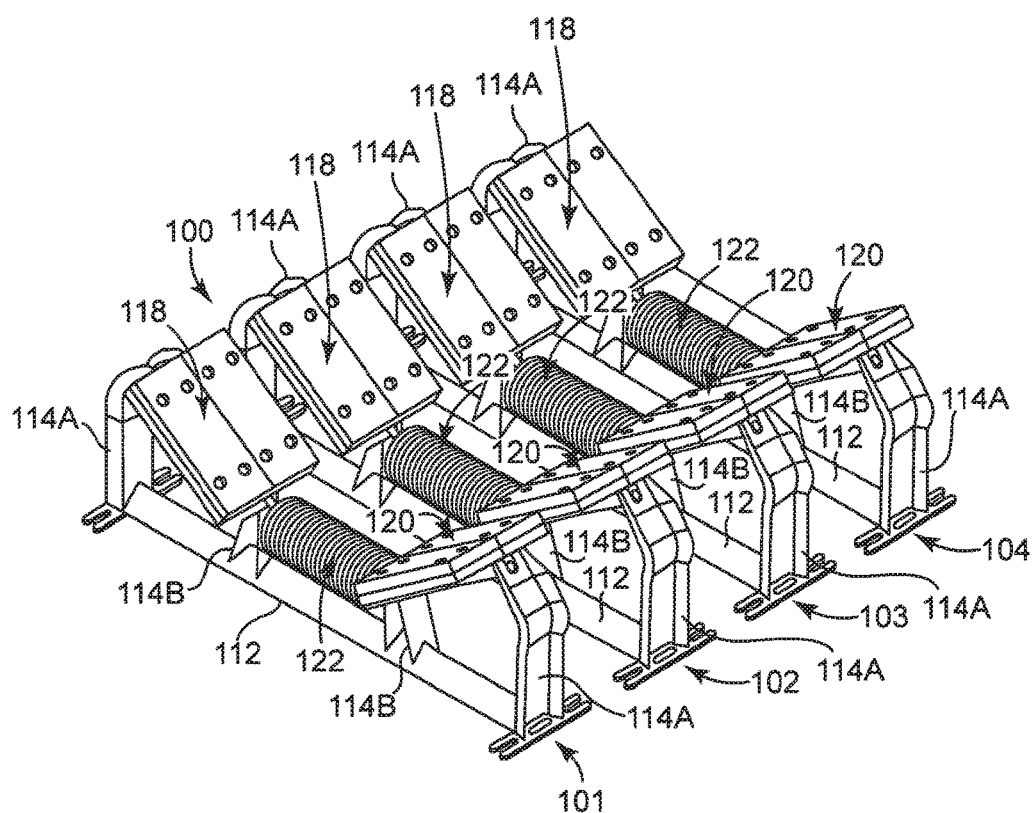
FIG. 2 is a perspective view of a load zone support assembly.
Figure 5:
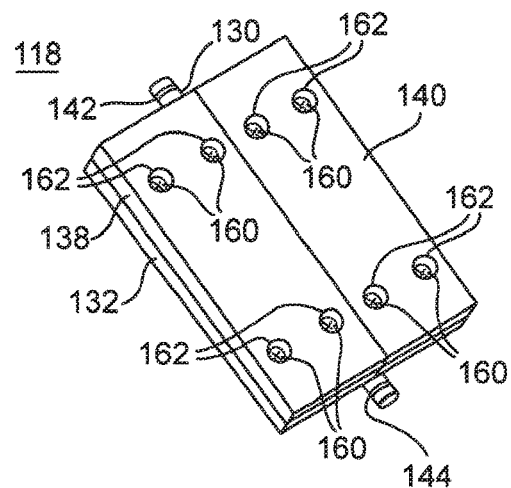
FIG. 5 is a perspective view of a cartridge assembly for use in a load zone support assembly.

FIG. 2 is a perspective of a load zone support assembly 100. The support assembly 100 includes a plurality of spaced apart idler frames or supports 101-104. Each frame 101-104 includes a base 112 connected to two outer perch supports 114A and two inner perch supports 114B. Frames 101-104 are similar in construction to the idler frames 10 illustrated in FIG. 1. For instance, outer supports 114A are at a specified height above base 112, greater than a specified height of inner supports 114B above base 112. To provide a load zone for a belt conveyor, a plurality of cartridge assemblies 118 and 120 as well as an impact roller 122 are coupled to each of the frames 101-104. In particular, one end of cartridge assemblies 118, 120 are coupled to outer supports 114A and one end of cartridge assemblies 118, 120 are coupled to inner supports 114B. Rollers 122 are supported on either side by inner supports 114B. Together, cartridge assemblies 118, 120 and roller 122 form a U-shaped trough to receive material loaded onto assembly 100. Cartridge assemblies 118 and 120 include coupling mechanisms to allow selective coupling of cartridge assemblies 118 and 120 to frames 101-104. In particular, the cartridge assemblies 118 and 120 remain stationary with respect to each of the frame 101-104.

Each cartridge assembly supports a belt such that sag of the belt is significantly reduced between consecutive idler frames (e.g. frames 101 and 102), as compared to using rollers in consecutive idler frames. In one embodiment, a center-to-center distance of consecutive frames (e.g. frames 101, 102) is 16" and a width of cartridge assembly 118 is 10". As a result, sag zone distance between consecutive cartridge assemblies 118 (e.g., of frames 101 and 102) is 6". In other embodiments, the sag zone distance can be in a range between approximately 2" and 12". By providing individual cartridge assemblies 118, 120, replacement of the assemblies can be performed quickly and easily, since only a particular assembly needs to be replaced at any one time, due to erosion of material on the respective cartridge assemblies 118, 120. Thus, instead of replacing an entire bar that spans multiple idler frames, a single assembly is replaced, saving time and resources in continued operation of a belt conveyor.

By way of example, as illustrated in FIGS. 3 to 6, cartridge assembly 118 includes a shaft 130, a support plate 132 and first and second wear pads 138, 140. Shaft 130 forms recessed grooves 142, 144 that slide into corresponding slots 146, 148 of outer support 114A and inner support 114B, respectively. In one embodiment, retaining clips 150, 152 can be utilized to retain shaft 130 of cartridge assembly 118 stationary with respect to supports 114A, 114B, respectively.

To assemble cartridge assembly 118, in one embodiment, support plate 132 is welded to shaft 130, for example using a stitch weld. To couple wear pads 138 and 140 to support plate 132, a plurality of fasteners 160 pass through corresponding apertures 162 in wear pads 138, 140 and apertures 164 in support plate 132. Fasteners 162 can then be secured using corresponding nuts 166.

Figure 6:
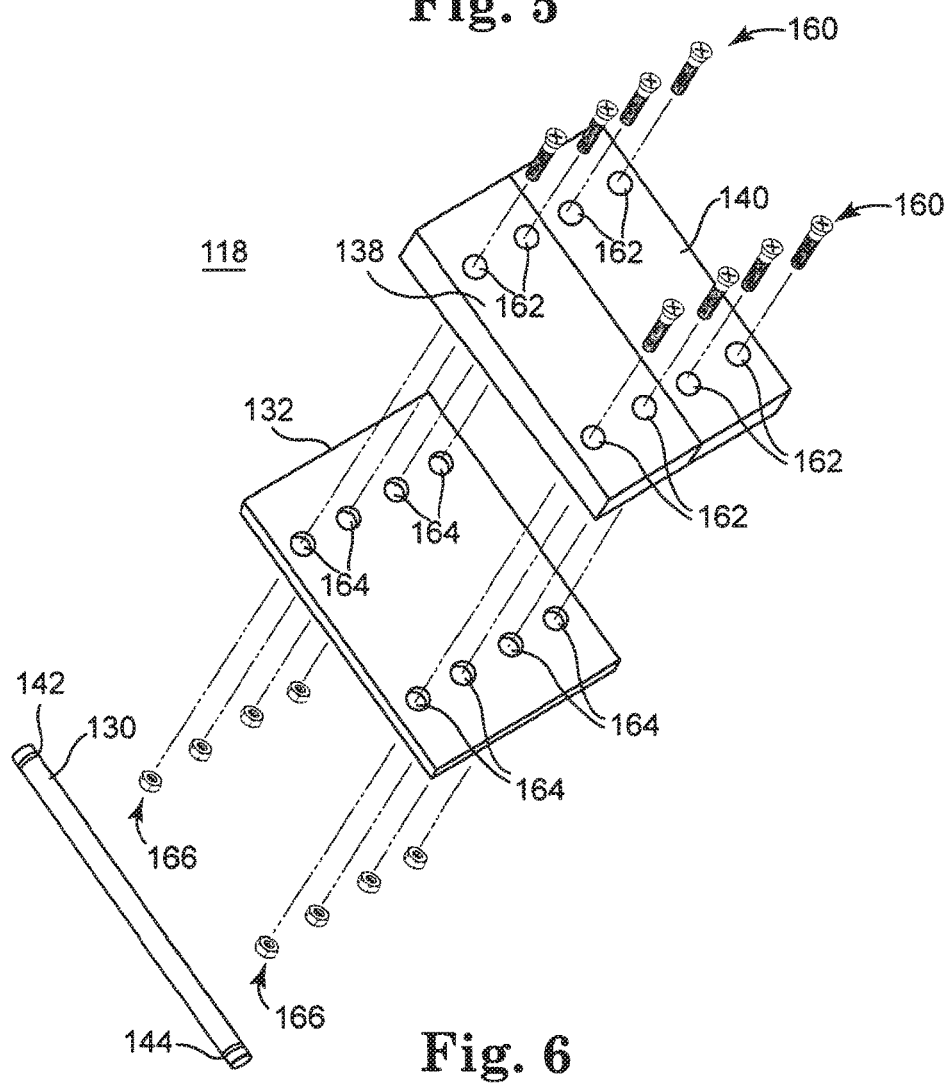
FIG. 6 is an exploded view of the cartridge assembly of FIG. 5.
Figure 8:
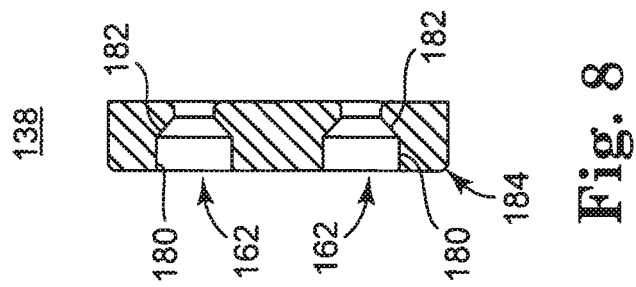
FIG. 8 is a cross-section along line 8-8 of FIG. 7.
Figure 7:
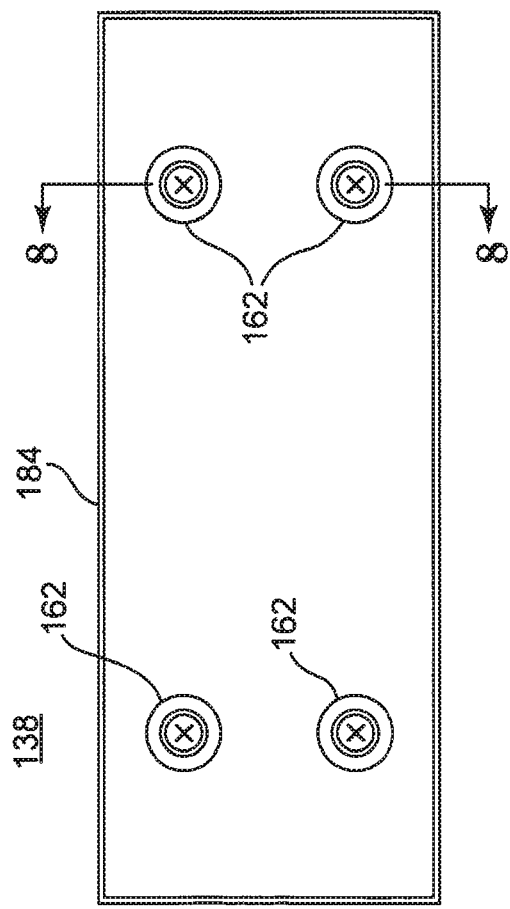
FIG. 7 is a top plan view of a wear pad.

FIGS. 6 and 7 illustrate wear pad 138. Apertures 162 include a bore 180 and countersink 182 to accommodate fasteners 160. Additionally, as desired, wear pad 138 can include a beveled edge 184 around a perimeter of the wear pad 138. In one embodiment, wear pad 138 is formed of ultra high molecular weight polyethylene. During use, wear pads 138 are exposed to impact from materials loaded onto load zone support assembly 100 as well as friction between belt 170 and wear pad 138. The impact and friction cause material of wear pad 138 to erode and eventually require replacement, so as to prevent damage to belt 170.

Figure 9:
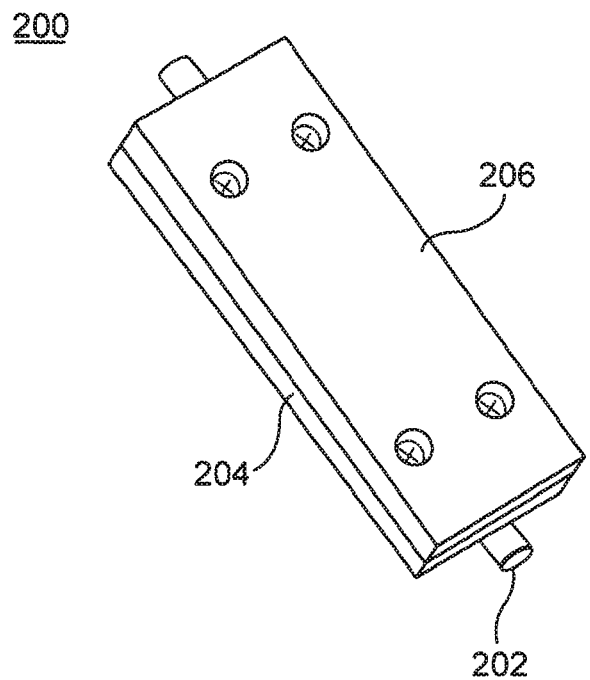
FIG. 9 is a perspective view of an alternative cartridge assembly for use in a load zone support assembly.

FIG. 9 is a perspective view of an alternative cartridge assembly 200. Cartridge assembly 200 includes a shaft 202, support plate 204 and a wear pad 206. In this embodiment, only a single wear pad is provided. The cartridge assembly 200 can be mounted to any of the support frames 101-104 to provide a load zone.

Although specific embodiments have been illustrated and described herein, it will be appreciated by those of ordinary skill in the art that a variety of alternate and/or equivalent implementations may be substituted for the specific embodiments shown and described without departing from the scope of the detailed description. This application is intended to cover any adaptations or variations of the specific idler roll retainer clips discussed herein. Therefore, it is intended that the invention be limited only by the claims and the equivalents thereof.

What is claimed is:

1. A cartridge assembly for installation on an idler frame disposed in a load zone of a belt conveyor system supporting a conveyor belt, the idler frame including an inner perch support having a first slot for supporting an idler roller shaft, the idler frame including an outer perch support having a second slot for supporting the idler roller shaft, the cartridge assembly comprising:

an elongated support member having a first end and a second end, said first end of said elongated support member supportable in the first slot of the inner perch support, said second end of said elongated support member supportable in the second slot of the outer perch support, wherein said support member has a support member length, wherein a portion of said support member length extending between said first end and said second end of said elongated support member corresponds to a distance between the first slot of the inner perch support and the second slot of the outer perch support; and a wear pad disposed above said elongated support member, said wear pad having a wear pad length aligned with said support member, said wear pad having a wear pad width less than said wear pad length, said wear pad being supported by said elongated support member.

2. The cartridge assembly of claim 1, wherein said elongated support member comprises a shaft.

3. The cartridge assembly of claim 1, wherein said first end of said elongated support member is configured to slidingly engage the first slot of the inner perch support, and wherein said second end of said elongated support member is configured to slidingly engage the second slot of the outer perch support.

4. The cartridge assembly of claim 1, wherein said first end of said elongated support member comprises a first groove configured to engage the first slot of the inner perch support, and wherein said second end of said elongated support member comprises a second groove configured to engage the second slot of the outer perch support.

5. The cartridge assembly of claim 1, wherein said support member length corresponds to a shaft length of the idler roller shaft.

6. The cartridge assembly of claim 1, wherein said wear pad width is dimensioned to extend to but not contact an adjacent idler frame in the loading zone.

7. The cartridge assembly of claim 6, wherein an overall width of the cartridge assembly is approximately 10 inches.

8. The cartridge assembly of claim 1, wherein an overall width of the cartridge assembly is slightly greater than a support base width of a support base of the idler frame.

9. The cartridge assembly of claim 1, wherein said support member is configured to be solely supported by said the inner and outer perch supports.

10. The cartridge assembly of claim 1, further comprising:

a support plate coupled to said elongated support member, said support plate having a support plate width greater than a support member width of said elongated support member, wherein said wear pad is removably mounted to said support plate.

11. The cartridge assembly of claim 10, wherein said wear pad is releasably secured in position by at least one removable fastener in contact with said wear pad, wherein said removable fastener is removably mounted to said support plate.

12. The cartridge assembly of claim 10, further comprising:

a second wear pad removably mounted to said support plate.

13. The cartridge assembly of claim 11, wherein said removable fastener includes a nut, wherein said nut is disposed on an opposite side of said support plate relative to said wear pad.

14. The cartridge assembly of claim 1, wherein said wear pad comprises first, second and third sidewalls, said first sidewall being shorter than each of said second and third sidewall, wherein said first end of said support member is disposed outward of said first sidewall.

15. The cartridge assembly of claim 14, wherein said wear pad is generally rectangular.

16. The cartridge assembly of claim 1, further comprising:
a first removable retaining device selectively retaining at least one of said first end and said second end of said elongated support member in position relative to at least one of said inner and outer perch supports.

17. An idler frame for use in a load zone of a belt conveyor system supporting a conveyor belt, comprising:
an inner perch support;
an outer perch support; and
a cartridge assembly removably installable on said inner and outer perch support, said cartridge assembly comprising:
an elongated support member having a first end and a second end, said first end of said elongated support member being removably supported by said inner perch support, said second end of said elongated support member being removably supported by said outer perch support, wherein a support member length extending between said first end and said second end of said elongated support member corresponds to a distance between said inner perch support and said outer perch support; and
a wear pad disposed above said elongated support member, said wear pad having a wear pad length generally aligned with said support member, said wear pad being supported by said support member.

18. The idler frame of claim 17, wherein said first end of said elongated support member slidingly engages a first slot of said inner perch support, and wherein said second end of said elongated support member slidingly engages a second slot of said outer perch support.

19. The idler frame of claim 17, wherein said first end of said elongated support member comprises a first groove slidingly engaging a first slot of said inner perch support, and wherein said second end of said elongated support member comprises a second groove slidingly engaging a second slot of said outer perch support.

20. The idler frame of claim 17, further comprising:
a first removable retaining device selectively retaining at least one of said first end and said second end of said elongated support member in position relative to at least one of said inner and outer perch supports.

21. The idler frame of claim 17, wherein said cartridge assembly is solely supported by said inner and outer perch supports.

22. The idler frame of claim 17, further comprising:
a support plate coupled to said elongated support member, said support plate having a support plate width greater than a support member width of said elongated support member, wherein said wear pad is removably mounted to said support plate.

23. A method for removably installing a cartridge assembly on an idler frame disposed in a load zone of a belt conveyor system supporting a conveyor belt, the idler frame including an inner perch support having a first slot for supporting an idler roller shaft, the idler frame including an outer perch support having a second slot for supporting the idler roller shaft, the method comprising:
positioning an elongated support member with a gap between the inner perch support and the outer perch support;
removably inserting a first end of an elongated support member of the cartridge assembly in the inner perch support;
removably inserting a second end of an elongated support member of the cartridge assembly in the outer perch support;
securing said elongated support member in position relative to the idler frame;
positioning an elongated wear pad above said elongated support member;
aligning said elongated wear pad with said elongated support member; and
removably mounting said elongated wear pad onto a support plate coupled to said elongated support member.

24. The method of claim 23, wherein said step of inserting said first end of said elongated support member in the inner perch support comprises slidingly engaging said first end with a first slot in the inner perch support.

25. The method of claim 23, wherein said step of inserting said first end of said elongated support member in the inner perch support comprises engaging a groove of said first end with a first slot in the inner perch support.

26. The method of claim 23, further comprising:
solely supporting a weight of said wear pad on the inner and outer perch supports.

27. The method of claim 26, further comprising:
positioning said wear pad between a first adjacent wear pad solely supported by a first adjacent idler frame and a second adjacent wear pad solely supported by a second adjacent idler frame.

28. The method of claim 26, further comprising:
removably positioning a portion of a removable fastener beneath said support plate.

29. A belt conveyor system, comprising:
a frame;
a head pulley supported on said frame;
a tail pulley supported on said frame;
an endless belt wrapped around said head pulley and said tail pulley; and
an idler frame operably supporting said endless belt, the idler frame comprising:
an inner perch support;
an outer perch support; and
a cartridge assembly removably installable on said inner and outer perch support, said cartridge assembly comprising:
an elongated support member having a first end and a second end, said first end of said elongated support member being removably supported by said inner perch support, said second end of said elongated support member being removably supported by said outer perch support, wherein a support member length extending between said first end and said second end of said elongated support member is equal to a distance between said inner perch support and said outer perch support; and
a wear pad disposed above said elongated support member, said wear pad having a wear pad length generally aligned with said support member, said wear pad having a wear pad width less than said wear pad length, said wear pad being supported by said support member.

30. The belt conveyor system of claim 29, wherein said first end of said elongated support member slidingly engages a first slot of said inner perch support, and wherein said second end of said elongated support member slidingly engages a second slot of said outer perch support.

31. The belt conveyor system of claim 29, wherein said first end of said elongated support member comprises a first groove slidingly engaging a first slot of said inner perch support, and wherein said second end of said elongated support member comprises a second groove slidingly engaging a second slot of said outer perch support.

32. The belt conveyor system of claim 29, wherein said idler frame is disposed in a load zone, wherein said load zone is closer to said tail pulley than to said head pulley.

33. The belt conveyor system of claim 29, wherein said support member is solely supported by said inner and outer perch supports.

34. The belt conveyor system of claim 29, further comprising:
a support plate coupled to said elongated support member, said support plate having a support plate width greater than a support member width of said elongated support member, wherein said wear pad is removably mounted to said support plate.

35. The belt conveyor system of claim 29, further comprising:
a first removable retaining device selectively retaining at least one of said first end and said second end of said elongated support member in position relative to at least one of said inner and outer perch supports.

36. A cartridge assembly for removable installation on an idler frame disposed in a load zone of a belt conveyor system supporting a conveyor belt, the idler frame including an inner perch support having a first slot for supporting an idler roller shaft, the idler frame including an outer perch support having a second slot for supporting the idler roller shaft, the cartridge assembly comprising:
a wear pad having a wear pad length; and
means for supporting said wear pad, said means for supporting said wear pad having a first end and a second end, said first end being configured to be removably received in the first slot of the inner perch support, said second end being configured to be removably received in the second slot of the outer perch support, wherein a distance between said first end and said second end corresponds to a gap between the first slot of the inner perch support and the second slot of the outer perch support, wherein said wear pad length is aligned with said means for supporting said wear pad.

37. The cartridge assembly of claim 36, wherein said means for supporting said wear pad comprises a shaft.

38. The cartridge assembly of claim 36, wherein said means for supporting said wear pad comprises an elongated support member and wherein said wear pad has a planar upper surface.

39. The cartridge assembly of claim 36, wherein said first end is configured to slidingly engage the first slot of the inner perch support, and wherein said second end is configured to slidingly engage the second slot of the outer perch support.

40. The cartridge assembly of claim 36, wherein said means for supporting said wear pad is configured to be solely supported by said the inner and outer perch supports.

* * * * *